United States Patent
Greuter et al.

(10) Patent No.: US 9,672,964 B2
(45) Date of Patent: Jun. 6, 2017

(54) HIGH FIELD STRENGTH VARISTOR MATERIAL

(75) Inventors: Felix Greuter, Baden-Ruetihof (CH); Michael Hagemeister, Zurich (CH); Oliver Beck, Wettingen (CH); Ragnar Osterlund, Ludvika (SE); Reto Kessler, Zurich (CH)

(73) Assignee: ABB SCHWEIZ AG, Baden (CH)

( * ) Notice: Subject to any disclaimer, the term of this patent is extended or adjusted under 35 U.S.C. 154(b) by 1044 days.

(21) Appl. No.: 12/894,755

(22) Filed: Sep. 30, 2010

(65) Prior Publication Data
US 2011/0079755 A1    Apr. 7, 2011

(30) Foreign Application Priority Data
Oct. 1, 2009 (EP) .................................. 09171946

(51) Int. Cl.
*H01C 7/112* (2006.01)
*C04B 35/453* (2006.01)
*H01B 1/08* (2006.01)

(52) U.S. Cl.
CPC ............ *H01C 7/112* (2013.01); *C04B 35/453* (2013.01); *C04B 2235/3262* (2013.01); *C04B 2235/3267* (2013.01); *C04B 2235/3275* (2013.01); *C04B 2235/3279* (2013.01); *C04B 2235/3284* (2013.01); *C04B 2235/3294* (2013.01); *C04B 2235/3298* (2013.01); *C04B 2235/3418* (2013.01); *C04B 2235/80* (2013.01); *C04B 2235/81* (2013.01); *C04B 2235/85* (2013.01); *H01B 1/08* (2013.01)

(58) Field of Classification Search
CPC .................................................... H01B 1/08
USPC ..... 252/519.1, 519.13, 519.14, 519.5, 519.52
See application file for complete search history.

(56) References Cited

U.S. PATENT DOCUMENTS

| | | | |
|---|---|---|---|
| 3,760,318 A * | 9/1973 | Masuyama et al. | 338/20 |
| 4,094,061 A | 6/1978 | Gupta et al. | |
| 4,180,483 A * | 12/1979 | Ho et al. | 252/519.54 |
| 4,184,984 A | 1/1980 | Levinson | |
| 4,297,250 A * | 10/1981 | Gupta et al. | 252/519.3 |

(Continued)

FOREIGN PATENT DOCUMENTS

| DE | 27 39 848 A1 | 3/1978 |
|---|---|---|
| EP | 0 320 196 A2 | 6/1989 |

(Continued)

OTHER PUBLICATIONS

Wong, J., "Microstructure and phase transformation in a highly non-ohmic metal oxide varistor ceramic," J. Applied Physics, vol. 46, No. 4, Apr. 1975, pp. 1653-1659.*

(Continued)

*Primary Examiner* — William Young
(74) *Attorney, Agent, or Firm* — Oliff PLC

(57) ABSTRACT

The present invention relates to a varistor material for a surge arrester with target switching field strength ranging from 250 to 400 V/mm comprising ZnO forming a ZnO phase and Bi expressed as $Bi_2O_3$ forming an intergranular bismuth oxide phase, said varistor material further comprising a spinel phase, characterized in that the amount of a pyrochlore phase comprised in the varistor material is such, that the ratio of the pyrochlore phase to the spinel phase is less than 0.15:1.

12 Claims, 5 Drawing Sheets

(56) References Cited

U.S. PATENT DOCUMENTS

| | | | |
|---|---|---|---|
| 4,719,064 A | | 1/1988 | Nakata et al. |
| 4,920,328 A | | 4/1990 | Hayashi et al. |
| 5,075,666 A | | 12/1991 | Radford |
| 5,107,242 A | | 4/1992 | Imai et al. |
| 5,225,111 A | * | 7/1993 | Imai .................. 252/519.52 |
| 6,184,771 B1 | | 2/2001 | Suzuki et al. |
| 6,620,346 B1 | | 9/2003 | Schulz et al. |
| 6,627,100 B2 | | 9/2003 | Ando et al. |
| 2009/0143216 A1 | * | 6/2009 | Tan et al. .................. 501/134 |

FOREIGN PATENT DOCUMENTS

| | | |
|---|---|---|
| EP | 0 473 419 A2 | 3/1992 |
| JP | A-2007-329148 | 12/2007 |

OTHER PUBLICATIONS

K. Eda et al., "Discovery of ZnO Varistors and Their Progress for the Two Decades—Progress in Fabrication Technology of Zinc Oxide Varistors," *Ceramic Transactions*, 1988, vol. 3, pp. 10-21.

B. Balzer et al., "Mechanical Strength and Microstructure of Zinc Oxide Varistor Ceramics," *J. Am. Ceram. Soc.*, 2004, vol. 87, No. 10, pp. 1932-1938.

M. Inada, "Crystal Phases of Nonohmic Zinc Oxide Ceramics," *Japanese Journal of Applied Physics*, Jan. 1978, vol. 17, No. 1, pp. 1-10.

M. Inada, "Effects of Heat-Treatment on Crystal Phases, Microstructure and Electrical Properties of Nonohmic Zinc Oxide Ceramics," *Japanese Journal of Applied Physics*, Aug. 1979, vol. 18, No. 8, pp. 1439-1446.

M. Inada, "Formation Mechanism of Nonohmic Zinc Oxide Ceramics," *Japanese Journal of Applied Physics*, Mar. 1980, vol. 19, No. 3, pp. 409-419.

E. Olsson et al., "Characterisation of individual interfacial barriers in a ZnO varistor material," *Interfacial Microstructure in ZnO Varistor Materials, Department of Physics*, 1988.

E. Olsson et al., "The Role of Interfacial Microstructure in ZnO Varistor Materials", *Interfacial Microstructure in ZnO Varistor Materials, Department of Physics*, 1988.

E. Olsson et al., "Development of functional microstructure during sintering of a ZnO varistor material," *Interfacial Microstructure in ZnO Varistor Materials, Department of Physics*, 1988.

European Search Report dated Mar. 4, 2010 in European Patent Application No. 09 17 1946.8.

Wong; "Microstructure and phase transformation in a highly non-Ohmic metal oxide varistor ceramic;" *Journal of Applied Physics*; 1975; pp. 1653-1659; vol. 26.

Matsuoka; "Nonohmic Properties of Zinc Oxide Ceramics;" *Japanese Journal of Applied Physics*; Jun. 1971; pp. 736-745; vol. 10, No. 6.

Kim et al.; "Sintering of Zinc Oxide Doped with Antimony Oxide and Bismuth Oxide;" *Journal of American Ceramic Society*; 1989; pp. 1390-1395; vol. 72, No. 8.

Pianaro; "Effect of $Cr_2O_3$ on the electrical properties of multicomponent ZnO varistors at the pre-breakdown region;" *Journal of Materials Science*; 1995; pp. 133-141; vol. 30.

Notice of Reasons for Rejection dated Jul. 1, 2014 from Japanese Patent Application No. 2010-218764 (English-language translation only).

* cited by examiner

A

B

HIGH FIELD STRENGTH VARISTOR MATERIAL

BACKGROUND

The present invention relates to a varistor material for a surge arrester, to a process for preparing said varistor material, and to the use of said varistor material for a surge arrester having a target switching field strength ranging from 250 to 400 V/mm.

Varistors, i.e. current/voltage non-linear resistors, are well known in the art and are frequently used as overvoltage protection devices. In general, overvoltage protection devices are employed in power systems or circuits of electronic equipment to protect the power system or electronic equipment by removing overvoltage superimposed on the normal voltage. The basis for this overvoltage protection is based on the varistor's characteristic to function as an insulator at normal voltage, but to show a low resistance when overvoltage is applied.

Among the known varistors, discs of a ZnO based varistor material are widely used. Apart from the main component ZnO, these varistor materials usually comprise many other additives which have an influence on the varistor's characteristics.

In this regard, the highly non-linear characteristics of varistor materials are mainly attributed to the presence of $Bi_2O_3$, which forms monolayers of Bi atoms around ZnO grains and creates potential barriers, and also of transition metals, such as Co, Mn and others, which stabilize the potential barriers by creating additional defects at the grain boundary. Conventional varistor materials further comprise $Sb_2O_3$ or $SiO_2$ in concentrations of some mol-% for microstructural control by forming so-called "spinels" that inhibit grain growth.

In addition to the ZnO phase, the intergranular bismuth oxide phase and the spinel phase, a fourth phase called pyrochlore phase of the nominal formula $Bi_3Sb_3Zn_2O_{14}$, which might include also other dopants in minor concentrations, is usually present. According to Inada et al, Japanese Journal of Applied Physics, 1980, Vol. 19, No. 3, pp. 409 to 419, for example, the pyrochlore phase starts to appear during sintering at temperatures of about 650 to 750° C. (depending on the actual composition) and disappears at temperatures above 950 to 1050° C., where spinel is formed out of pyrochlore. Nevertheless, varistors sintered even at a temperature above 1200° C. generally have a pyrochlore phase to a certain extent, due to a reformation during relatively slow cooling rates existing in production. According to the mentioned report by Inada, the pyrochlore is assumed to play no role in the nonohmic property.

Desired properties of good varistor materials are a well-defined switching voltage $V_S$ or switching field strength $E_S$, respectively, a high non-linearity coefficient α (alpha) in the switching region—according to equation $I=(V/C)^{\alpha\ (alpha)}$ a high energy uptake, low power losses and a high stability during lifetime.

The switching voltage $V_S$ is approximately 3 volts per grain boundary and depends on the total number of grain boundaries in series, and therefore also on the number of varistor discs in series and on the block size. The switching field strength $E_S$ is a material property and is determined by the grain size of the material or the density of grain boundaries, respectively. In the following, $E_S$ is defined as the switching field strength at a current density of 0.1 mA/cm². Most of the commercially available varistor materials have a switching field strength in the range 150-250 V/mm. Hence, varistors with such a switching field strength can be designated "normal field varistors" or "medium field varistors". Consequently, varistors with a switching field strength below 150 V/mm are designated "low field varistors", and varistors with a switching field strength above 250 V/mm are designated "high field varistors". In the following, an additional differentiation between the expression "high field varistor" ($E_S$=250-400 V/mm) and "extra high field varistor" ($E_{S\geq}$400 V/mm) is made.

A high field varistor material is of special interest for high voltage arresters (or "surge arresters"), since it allows reducing its dimensions. Providing such a high field varistor material is however very challenging, mainly due to its thermal management.

On one hand, the power losses during normal continuous operation of a high field varistor are generated in a smaller volume, causing the varistor disc and parts of the arrester housing to run at elevated temperatures. Higher temperatures are often not desired or acceptable, due to the resulting ageing of all the involved materials. High temperatures at normal operating conditions also reduce the capability of the varistor to absorb thermal load during an overvoltage pulse and add a risk for thermal runaway after such loading conditions. Therefore, significantly lower specific power losses (power losses normalized to the volume and the applied field strength) for high field varistor materials are required compared to varistor materials with normal switching field strength.

On the other hand, thermal loading during an overvoltage pulse is also more severe because of the smaller volume. Therefore also excellent impulse performance is needed, leading to the requirements of high electrical non-linearity in the high current region and high energy absorption capability.

In addition, degradation of electrical properties over lifetime must be avoided.

To reach high or extra high field strengths, the grain size of the varistor material has to be significantly reduced.

Several possibilities to influence the grain size and hence the switching field strength are known. One option is the reduction of the sintering temperature—as for example referred to in U.S. Pat. No. 4,719,064—with the result of smaller grains and a higher switching field strength. This is however only possible within a certain range, since lower sintering temperatures usually lead to lower non-linearity and downgraded impulse performance. With regard to the decrease in the non-linearity coefficient by lowering the top temperature and shortening the dwell time during sintering, the effect is for example shown in Balzer et al, J. Am. Ceram. Soc., vol. 87, No. 10 (2004), pp. 1932. An additional disadvantage of a too low sintering temperature lies in the fact that thereby the material does often not densify properly during sintering, leaving a porous structure, which could reduce the energy absorption capability.

Another option to adjust the electrical properties of varistor materials is by changing the chemical composition.

Of the components contained in conventional varistor materials, $Bi_2O_3$ is the only component forming liquid phase during sintering. The reduction of $Bi_2O_3$ content therefore reduces the amount of liquid phase during sintering, slowing down grain growth, and thus also increasing the switching field strength. However, the effect of increasing the switching field strength by the reduction of bismuth is relatively small. In addition, more bismuth is necessary for smaller grains to cover the grain boundaries and to form stable potential barriers. Otherwise the non-linearity gets heavily reduced.

As mentioned above, $Sb_2O_3$ is often used in conventional varistor materials for controlling the microstructure and for increasing the switching field. Antimony is known to form zinc antimony spinels at an early stage of sintering that hinder grain growth. The addition of $Sb_2O_3$ is for example disclosed in EP-A-0961300. As will be pointed out in detail below, $Sb_2O_3$ has however recently been found to have a negative impact on the non-linearity and the power loss of the varistor material due to an absorption of a part of the available bismuth oxide.

It has further been proposed to add silicon in the range of 0.1 to several mol-% for reaching a higher field strength. In this regard it is for example referred to U.S. Pat. No. 5,107,242, according to which silicon oxide is used in an amount of 0.6 to 2.0 mol-%, said silicon oxide precipitating in the grain boundary layer to prevent development of ZnO grains. The use of silicon is further taught in EP-A-0 320 196, U.S. Pat. No. 4,920,328, U.S. Pat. No. 4,719,064, DE-A-2739848 and U.S. Pat. No. 5,075,666.

The silicon addition provokes the formation of zinc silicon spinels with a similar effect as antimony. However, the increase of the switching field strength for compositions with high silicon content is often tremendous, leading not only to a high field varistor material but to an extra high field varistor material.

SUMMARY

Given the above disadvantages of the state of the art, the object of the present invention is to provide a high field varistor material having low power loss levels. It is a further object that said varistor material has at the time excellent performance with regard to other electrical properties, in particular electrical characteristics, i.e. the non-linear current-voltage curve (or current density-field strength curve, respectively), impulse behavior and lifetime stability.

The object of the present invention is achieved by the varistor material described herein.

DETAILED DESCRIPTION

Figure 1:
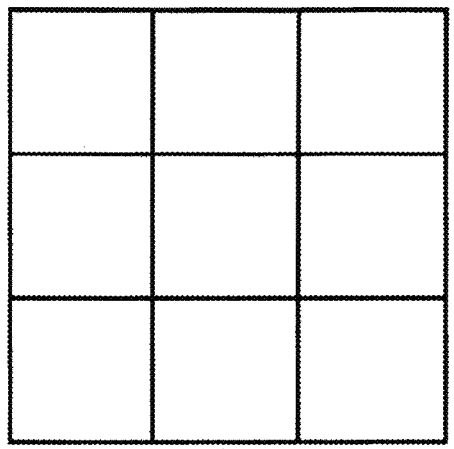
FIG. 1 shows a schematic representation of the microstructure of
a) a low field strength varistor material with a relatively large grain size, and
b) a high field strength varistor material with a grain size of a diameter which is three times smaller than in a)
Figure 1:
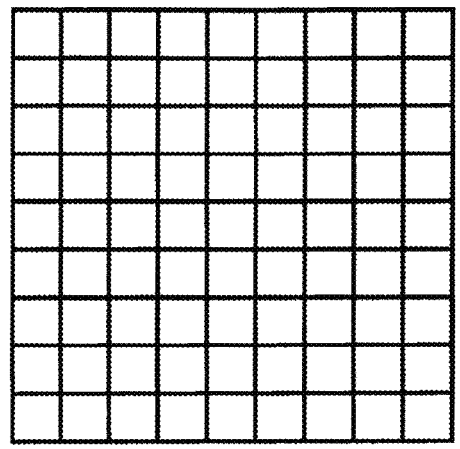

The varistor material of the present invention comprises ZnO forming a ZnO phase and Bi expressed as $Bi_2O_3$ forming a $Bi_2O_3$ phase. The varistor material further comprises a spinel phase.

In contrast to conventional varistor materials, the high field varistor material of the present invention is characterized in that it comprises only a limited amount of a pyrochlore phase or no pyrochlore phase at all. The amount of a pyrochlore phase in the varistor material of the present invention is such, that the ratio of the pyrochlore phase to the spinel phase is less than 0.15:1. The ratio thereby represents the X-ray intensity ratio of the highest peak of the pyrochlore phase to the highest peak of the spinel phase, measured with Cu Kα (alpha) radiation. However the highest peaks of pyrochlore and spinel phase itself are normally not suited for quantification, since they overlap with other phases of the varistor material. Instead of measuring the highest peak of a phase, a different dominant peak can be measured, for which the peak ratio to the highest peak is known. In this case, the intensity of the measured peak has to be multiplied with the peak ratio to calculate the intensity of the highest peak.

The present invention is based on the surprising finding that the formation of pyrochlore during sintering goes along with a decrease of the non-linearity and also an increase of the power loss of the varistor material. Without any intention of being bound by the theory, it is assumed that the fraction of bismuth, which is bound to the pyrochlore, is missing at the grain boundaries, thereby provoking low and instable potential barriers.

This observation is in contrast to what is taught in the state of the art, in particular in the article of Inada et al., which teaches that the pyrochlore plays no role in the nonohmic property.

By reducing or avoiding the pyrochlore phase according to the present invention, a high field varistor material having an excellent non-linearity coefficient and a very low power loss, even at elevated temperatures, is achieved. With regard to the power loss, values below 40 mW/($cm^2$*kV), preferably below 35 mW/($cm^2$*kV), at 115° C. can be achieved according to the present invention.

According to a preferred embodiment of the present invention, the ratio of the pyrochlore phase to the spinel phase is less than 0.1:1.

In general, the high field varistor material of the present invention comprises—apart from the ZnO and the $Bi_2O_3$—a mixture of spinel forming components comprising Mn, Co, Ni and Cr expressed as $MnO_2$, CoO, NiO and $Cr_2O_3$, respectively. As a further contrast to the teaching of the state of the art, in particular of U.S. Pat. No. 5,107,242, the amount of $SiO_2$ comprised in the varistor material of the present invention is generally held low, and preferably is less than 0.05 mol-%.

A varistor material according to the present invention can be obtained by suitably choosing the amounts of its components and/or setting the process parameters during its preparation.

According to a first type of the varistor material of the present invention, the amount of $Bi_2O_3$ is at least 0.3 mol-%, more preferably at least 0.6 mol-%, most preferably from 0.6 mol-% to 0.9 mol-%, the amount of $Sb_2O_3$ is less than 1.8 mol-%,
the molar ratio of $Bi_2O_3$ to $Sb_2O_3$ is at least 0.5:1
and the total amount of $MnO_2$, CoO, NiO and $Cr_2O_3$ is at least 2.5 mol-%, more preferably at least 3 mol-%.

As mentioned above, it has been found that a high concentration of antimony does not only form an increasing number of particles of zinc antimony spinel, which act as grain growth inhibitor and hence would be desired for the increase of the switching field strength, but that also a pyrochlore phase is formed, absorbing part of the available bismuth oxide and making it inactive for the grain boundary activation.

By keeping the amount of antimony low, specifically less than 1.8 mol-%, the pyrochlore phase is reduced, resulting in an increase of the non-linearity and a decrease of the power loss levels of the first type varistor material defined above.

As will be shown in the context of the Figures, essentially no pyrochlore phase is formed when the amount of $Sb_2O_3$ is held below 1.8 mol-%. It is further preferred that the amount of $Sb_2O_3$ is less than 1.5 mol-%, most preferably from 0.9 mol-% to 1.5 mol-%.

Instead of a high amount of antimony, the first type varistor material of the present invention comprises a mixture of spinel forming components comprising the transition metals Mn, Co, Ni and Cr, the total amount of $MnO_2$, CoO, NiO and $Cr_2O_3$ being at least 2.5 mol-%, more preferably at least 3 mol-%. Due to the presence of the above transition metal components in the respective high concentrations, additional spinel particles are formed, thus allowing an increase in the switching field strength similar to Sb addition, but with the big advantage that no bismuth is removed from the grain boundaries by being bound to pyrochlore phase. The creation of potential barriers of high quality is thus not affected in the varistor material of the present invention.

In contrast to the general teaching of the state art, according to which the Bi-content must be strongly reduced, Sb doping must be increased and elevated Si-doping levels should be used in order to obtain high field strength characteristics, experiments have shown that the first type varistor material of the present invention is superior with regard to non-linearity coefficient, specific power loss and long-term stability in comparison with a material prepared according to the mentioned teaching of the state of the art of high field varistor material.

According to a second type varistor material of the present invention, the amount of $Bi_2O_3$ is less than 0.5 mol-%, the molar ratio of $Bi_2O_3$ to $Sb_2O_3$ being less than 0.4:1, preferably less than 0.3:1, most preferably less than 0.25:1, and the total amount of MnO, CoO, NiO and $Cr_2O_3$ is at least 4 mol-%. Due to this composition, a ratio of the pyrochlore phase to the spinel phase of less than 0.15 can be achieved. A corresponding process for preparing the second type varistor material is specified below.

According to a further preferred embodiment, the mixture of spinel forming components further comprises at least one additional spinel forming component selected from the group consisting of Fe, Al, Ti, Mg and Cu.

It is further preferred that the material additionally comprises at least one dopant selected from the group consisting of Ag and B.

The present invention further relates to a process for preparing a varistor material according to the present invention, wherein a starting composition comprising $Bi_2O_3$, $Sb_2O_3$, $MnO_2$, CoO, NiO and $Cr_2O_3$,
is mixed with ZnO and optionally remaining dopants, compacted to discs, preferably cylindrical discs, and sintered at a temperature above 1000° C. to obtain the varistor material.

In general, the components of the varistor material are dispersed, milled and mixed in an aqueous suspension ("slurry") together with organic additives, such as a dispersing agent, a binder and/or a lubricant. The slurry is granulated to powder particles by spray drying. The powder is compacted to discs and sintered at temperatures above 1000° C. to develop the final varistor properties. The sintered block is then usually subjected to a metallization and glazing step.

If a composition according to the second type varistor material is used, a ratio of the pyrochlore phase to the spinel phase of less than 0.15:1 is obtained by subjecting the starting composition to a calcination step at a temperature above 600° C. before mixing it with ZnO and optionally remaining dopants, compacting it to cylindrical discs and sintering it.

Given the characteristics obtained, the varistor material of the present invention is particularly suitable for a surge arrester having a target switching field strength ranging from 250 to 400 V/mm.

The present invention is further illustrated by way of the following Examples:

Examples

Discs of a varistor material have been prepared by using—in addition to ZnO as main component—the amounts of $Bi_2O_3$ and $Sb_2O_3$ as indicated in Tables 1 and 2. The varistor material of these examples further comprises a mixture of spinel forming components comprising Mn, Co, Ni and Cr expressed as $MnO_2$, CoO, NiO and $Cr:O_3$, with $MnO_2$ being about 0.7 mol-%, CoO being about 1.4 mol-%, NiO being about 1.4 mol-% and $Cr_2O_3$ being about 0.1 mol. For each varistor material, the respective switching field strength ($E_S$), non-linearity coefficient α (alpha) and power loss ($P_L$) at 115° C. are also indicated in Tables 1 and 2.

Methods for determining the phases inside the material are well known to the skilled person and include diffraction methods such as neutron diffraction or X-ray diffraction. In particular, the phases have in the context of the present examples been determined by XRD with Cu Kα (alpha) radiation. For quantitative analysis, the [6 2 2] pyrochlore peak and the [4 0 0] spinel peak were used, because (i) both peaks are stand-alone and there is thus no overlap with peaks from other phases, and (ii) both peaks are dominant peaks of their phase and can easily be detected if the phase is present.

TABLE 1

| $Bi_2O_3$ [mol-%] | $Sb_2O_3$ [mol-%] | Es [V/mm] | alpha | $P_L$ at 115° C. [mW/(kV * $cm^2$)] | Py/Sp |
|---|---|---|---|---|---|
| 0.75 | 1 | 307 | 89 | 25 | 0.00 |
| 0.75 | 1.5 | 363 | 89 | 28 | 0.02 |
| 0.75 | 2 | 403 | 90 | 23 | 0.06 |
| 0.75 | 2.5 | 403 | 78 | 35 | 0.14 |
| 0.75 | 3 | 441 | 75 | 51 | 0.20 |
| 0.75 | 3.5 | 443 | 31 | 119 | 0.31 |

TABLE 2

| Bi$_2$O$_3$ [mol-%] | Sb$_2$O$_3$ [mol-%] | Es [V/mm] | alpha | P$_L$ at 115° C. [mW/(kV * cm$^2$)] | Py/Sp |
|---|---|---|---|---|---|
| 0.25 | 1.5 | 484 | 61 | 53 | 0.00 |
| 0.50 | 1.5 | 398 | 75 | 43 | 0.01 |
| 0.75 | 1.5 | 363 | 89 | 28 | 0.02 |
| 1.00 | 1.5 | 333 | 89 | 30 | 0.06 |
| 1.25 | 1.5 | 309 | 91 | 32 | 0.07 |
| 0.25 | 3.5 | 523 | 20 | 120 | 0.03 |
| 0.50 | 3.5 | 461 | 18 | 174 | 0.21 |
| 0.75 | 3.5 | 443 | 32 | 119 | 0.31 |
| 1.00 | 3.5 | 432 | 67 | 59 | 0.49 |
| 1.25 | 3.5 | 397 | 65 | 46 | 0.39 |

As given in Table 1, a relatively high non-linearity coefficient α as well as low power losses are obtained according to the present invention, in which the amount of a pyrochlore phase is such that the ratio of the pyrochlore phase to the spinel phase is less than 0.15:1. A graphical representation of the ratio of pyrochlore phase to spinel phase of the varistor material given in Table 1 is given in FIG. 4 discussed below.

As discussed above, one technical measure taught in the state of the art for lowering the grain size of a varistor material and for increasing its switching field strength is to reduce the amount of Bi$_2$O$_3$ and thus of liquid phase present during sintering. However, a minimum amount of Bi$_2$O$_3$ is necessary to cover all the grain boundaries with bismuth and to form high quality potential barriers.

As is clear from Table 2, a too low amount of Bi$_2$O$_3$ in the composition of the first type can result in a varistor material having a relatively poor non-linearity coefficient and relatively high power losses although the ratio of the pyrochlore phase to the spinel phase is relatively low.

The results obtained are further discussed by way of the attached Figures.

From FIG. 1 it becomes apparent that for the smaller grain size of the high field strength varistor given under b), the minimum amount of Bi$_2$O$_3$ to cover all grain boundaries becomes higher, since the interface area is increased. In a rough estimation, the minimum Bi$_2$O$_3$ concentration needed scales with the $3^{rd}$ power of the reciprocal grain size, according to $$Bi_2 = (d_1/d_2)^3 * Bi_1,$$

where $d_1$ and $d_2$ are the diameters of the grains of the respective varistor material, and $Bi_1$ and $Bi_2$ the corresponding minimum Bi$_2$O$_3$ concentrations to obtain stable potential barriers.

Figure 2:
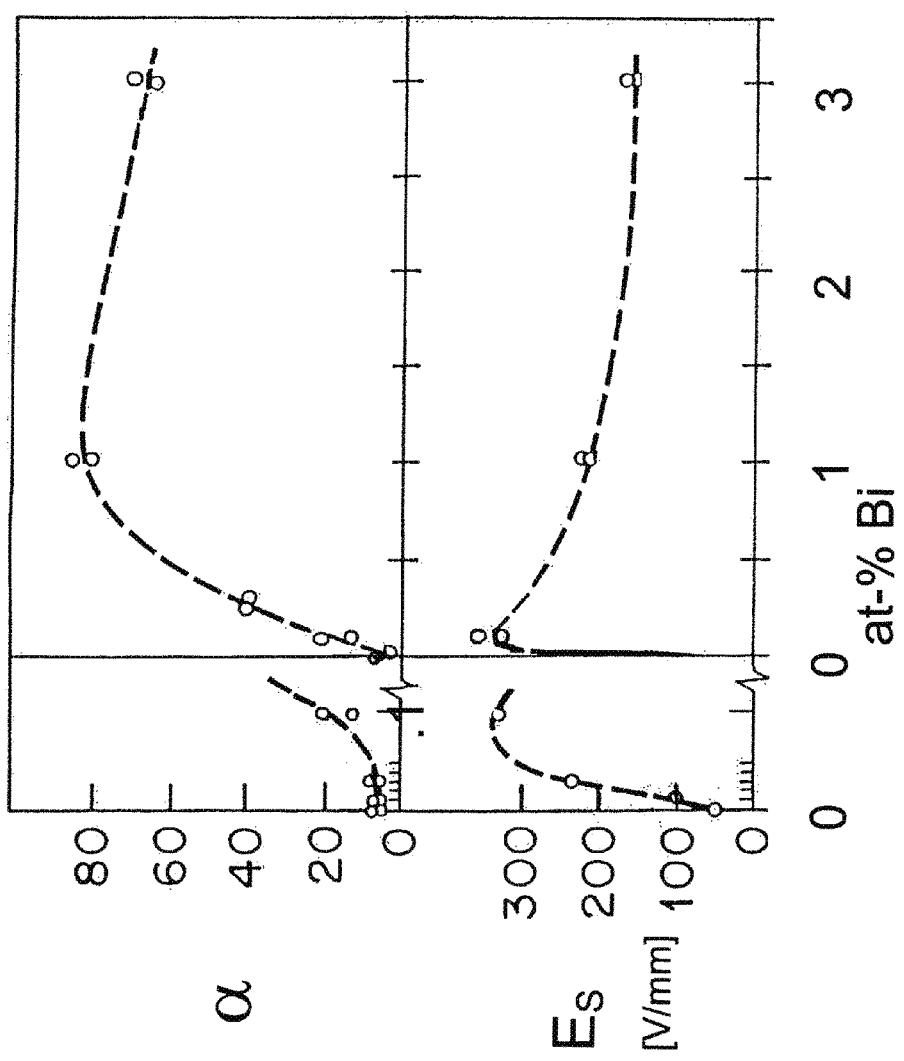
FIG. 2 shows a graphical representation of the non-linearity coefficient α (alpha) and the switching field strength $E_S$ of a varistor material as a function of its bismuth content.

The impact of a low bismuth concentration on the non-linearity coefficient and the switching field strength is displayed in FIG. 2, according to which the optimum Bi$_2$O$_3$ content for obtaining small grains (and thus a high switching field strength) and the optimum Bi$_2$O$_3$ content for high non-linearity coefficients lead to the opposite directions. This is reflected by the first type varistor material of the present invention, according to which the amount of Bi expressed as Bi$_2$O$_3$ is set to at least 0.3 mol-%, and most preferably to 0.6 mol-% to 0.9 mol-%. There is thus sufficient bismuth for all grain boundaries available, while keeping the amount of liquid phase as low as possible.

Figure 3:
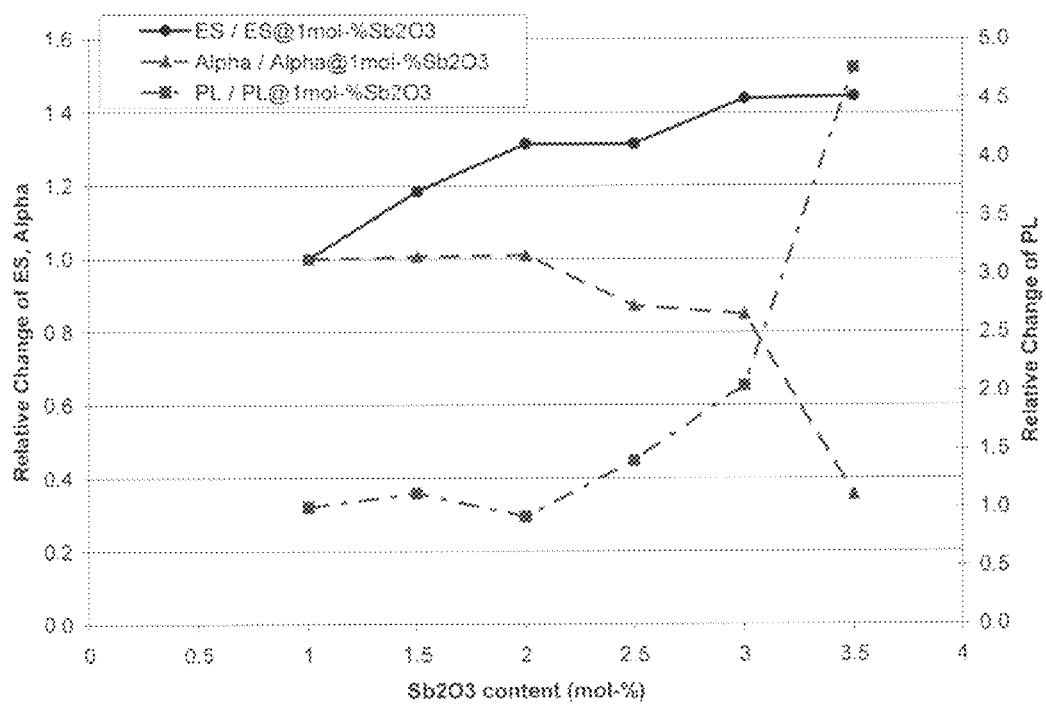
FIG. 3 shows a graphical representation of the relative change of the switching field strength $E_S$, the non-linearity coefficient α (alpha) and the power loss $P_L$ of a varistor material as a function of its $Sb_2O_3$ content.

A further technical measure taught in the state of the art for increasing the switching field strength of the varistor material is the addition of Sb$_2$O$_3$. As shown in FIG. 3, the addition of Sb$_2$O$_3$ is, however, subject to limitations. Although according to FIG. 3, the switching field strength is increased with increasing the amount of Sb$_2$O$_3$, it goes along with a significant reduction of the non-linearity coefficient and a strong increase of power loss, if a critical concentration of approximately 2.5 mol-% Sb$_2$O$_3$ is exceeded. This is reflected in the first type varistor material of the present invention, according to which the amount of Sb expressed as Sb$_2$O$_3$ is less than 1.8 mol-%.

For high antimony concentrations, not only zinc antimony spinel is present but an additional pyrochlore phase.

Figure 4:
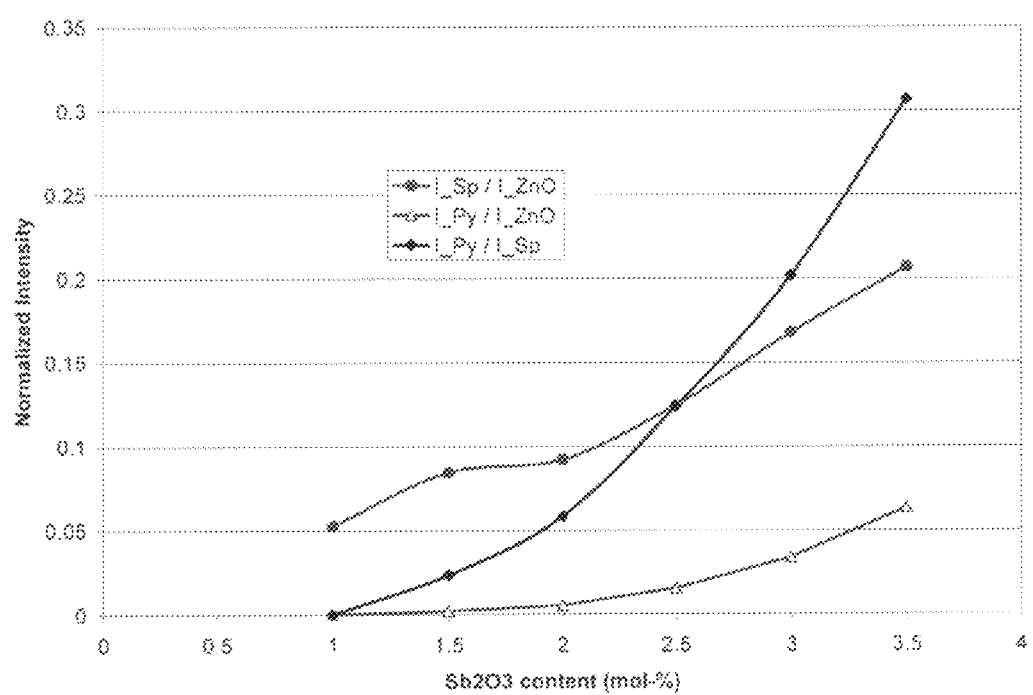
FIG. 4 shows a graphical representation of the normalized intensities of the peak of spinel [4 0 0] and the peak of pyrochlore [6 2 2] (with the peak of ZnO [1 0 0] being used for normalization) as well as the ratio of pyrochlore to spinel of the varistor materials according to Table 1 as a function of their $Sb_2O_3$ content.

According to FIG. 4, compositions with different Sb$_2$O$_3$ content were analyzed using X-ray diffraction. For high antimony concentrations, it was found that—apart from ZnO and bismuth oxide phases—not only zinc antimony spinel is present, but that a pyrochlore phase starts to form. In the graphical representation shown in FIG. 4, the intensities of the [4 0 0] peak of spinel (at 2θ=42.07° for CuKα radiation) and of the [6 2 2] peak of pyrochlore (at 2θ=58.43° for CuKα radiation) were normalized to the intensity of the [1 0 0] peak of ZnO (at 2θ=31.77° for CuKα radiation). As can be seen from FIG. 4, the amount of spinel phase is progressively increasing with increasing Sb$_2$O$_3$ content, but for concentrations between 2 and 2.5 mol-% Sb$_2$O$_3$, an additional pyrochlore phase starts to form, which is continuously increasing for higher Sb$_2$O$_3$ contents.

It has been observed that there is a strong correlation between pyrochlore formation and deterioration of electrical properties, which start both at the same concentration, between 2 and 2.5 mol-%, Sb$_2$O$_3$. Without any intention of being bound by the theory it is assumed that part of the Bi$_2$O$_3$ is bound in the sintered varistor to the pyrochlore phase, hence missing at the grain boundaries, and provoking instable potential barriers. Such behavior is especially found in case of high field materials, where the Bi$_2$O$_3$ content is kept low to minimize the amount of liquid phase. Furthermore, addition of Sb$_2$O$_3$ over the starting point of pyrochlore formation has a strong negative impact in two ways—first, a higher fraction of pyrochlore phase is produced, binding a larger amount of bismuth, and second, grain size is decreased, which would require a higher content of Bi$_2$O$_3$ to sufficiently cover all grain boundaries and prevent poor electrical performance.

According to the first type varistor material of the present invention, the antimony content is kept at a level, where no detectable pyrochlore is formed. The remaining increase of the switching field strength E$_S$ can, according to the invention, be achieved by using a high total concentration of a mixture of spinel forming components comprising the four metal oxides CoO, MnO$_2$, Cr$_2$O$_3$ and NiO. It was observed that if this mixture is used in higher concentrations than necessary for obtaining the desired electronic properties, the excess Co, Mn, Cr and Ni atoms can be preferably found in the spinel phase (together with Sb and part of Zn), changing its composition (Zn, Sb, Co, Mn, Cr, Ni)$_3$O$_4$ (i.e. $(Zn_{x1}Sb_{x2}Co_{x3}Mn_{x4}Cr_{x5}Ni_{x6})O_4$ with x1+x2+x3+x4+x5+x6=3), with the exact ratio of Zn, Sb, Co, Mn, Cr and Ni atoms in the spinel subject to variation and depending on the concentrations of the different additives in the varistor material. In addition, a higher fraction of spinel phase in the varistor material is generated and the grain size is reduced, provoking the desired increase of the switching field strength.

As given above, the present invention allows for providing a high field varistor material with switching field strength ER in the range from 250 to 400 V/mm. Since critical Sb$_2$O$_3$ content for pyrochlore formation is not exceeded, no bismuth is bound and all Bi$_2$O$_3$ in the varistor material is available to form stable potential barriers. The result is a high field varistor material with excellent non-linearity coefficient and very low power losses, even at high temperatures.

Figure 5:
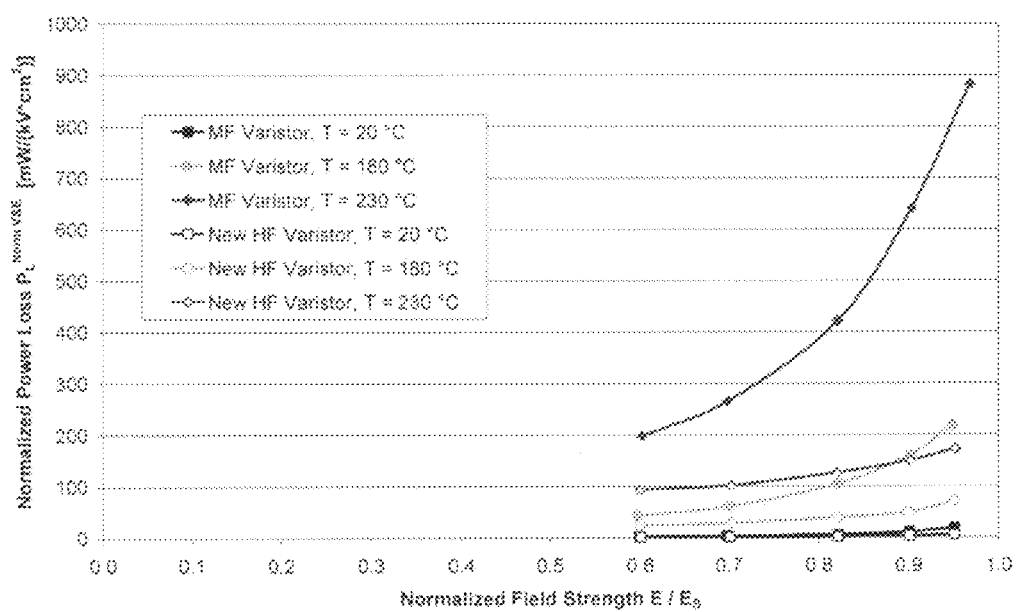
FIG. 5 shows a graphical representation of the normalized power loss (normalized to the applied field strength and the volume of the block) of a medium field varistor material according to the state of the art and of a high field varistor material according to the present invention as a function of the field strength at three different temperatures.

The power loss measured at AC voltage (50 Hz) of a medium field varistor material according to the state of the art and a high field varistor material according to the present invention at three different temperatures is graphically shown in FIG. 5. Thereby, the power loss is normalized to the applied field strength and the volume of the block, whereas the field strength is normalized with the switching field strength at AC load. It can be seen from FIG. 5 that the low power loss characteristics of the material according to the present invention are even more pronounced at higher temperatures and field strengths. Very low power losses at high temperatures are of particular importance after an overvoltage pulse. Because of the smaller volume, the high field material is heated up to higher temperatures. Back in normal operation mode, the varistor runs at increased temperature during the first hours. Given the low power loss at high temperatures, the danger for thermal runaway is vastly decreased in the varistor material of the present invention, which is an essential requirement for application with high field varistors.

The invention claimed is:

1. A varistor material for a surge arrester comprising ZnO forming a ZnO phase and Bi expressed as $Bi_2O_3$ forming an intergranular bismuth oxide phase, the varistor material further comprising a mixture of spinel forming components comprising Mn, Co, Ni and Cr expressed as $MnO_2$, CoO, NiO and $Cr_2O_3$, respectively, and optionally Si expressed as $SiO_2$, the amount of $SiO_2$ being less than 0.05 mol %, said varistor material further comprising a spinel phase, wherein the amount of a pyrochlore phase comprised in the varistor material is such that the ratio of the pyrochlore phase to the spinel phase is less than 0.15:1.

2. The varistor material according to claim 1, wherein the ratio of the pyrochlore phase to the spinel phase is less than 0.1:1.

3. The varistor material according to claim 1, wherein a target switching field strength ranges from 250 to 400 V/mm.

4. The varistor material according to claim 1, wherein:
the amount of $Bi_2O_3$ is at least 0.3 mol %,
the amount of $Sb_2O_3$ is less than 1.8 mol %,
the molar ratio of $Bi_2O_3$ to $Sb_2O_3$ is at least 0.5:1, and
the total amount of $MnO_2$, CoO, NiO and $Cr_2O_3$ is at least 2.5 mol %.

5. The varistor material according to claim 1, wherein
the amount of $Bi_2O_3$ is less than 0.5 mol %,
the molar ratio of $Bi_2O_3$ to $Sb_2O_3$ being less than 0.4:1 the total amount of $MnO_2$, CoO, NiO and $Cr_2O_3$ is at least 4 mol %.

6. The varistor material according to claim 1, the mixture of spinel forming components additionally comprising at least one additional spinel forming component selected from the group consisting of Fe, Al, Ti, Mg and Cu.

7. The varistor material according to claim 1, the material additionally comprising at least one dopant selected from the group consisting of Ag and B.

8. A process for preparing a varistor material according to claim 1, wherein a starting composition comprising $Bi_2O_3$, $Sb_2O_3$, $MnO_2$, CoO, NiO and $Cr_2O_3$ is mixed with ZnO and optionally remaining dopants, compacted to discs and sintered at a temperature above 1000° C. to obtain the varistor material.

9. A process for preparing a varistor material according to claim 5, wherein a starting composition comprising $Bi_2O_3$, $Sb_2O_3$, $MnO_2$, CoO, NiO and $Cr_2O_3$ is mixed with ZnO and optionally remaining dopants, compacted to discs and sintered at a temperature above 1000° C. to obtain the varistor material, and wherein the starting composition of $Bi_2O_3$, $Sb_2O_3$, $MnO_2$, CoO, NiO and $Cr_2O_3$ is calcinated at a temperature above 600° C. before mixing it with ZnO and optionally remaining dopants.

10. A surge arrester having a target switching field strength ranging from 250 to 400 V/mm, comprising the varistor material according to claim 1.

11. A varistor material for a surge arrester comprising ZnO forming a ZnO phase and Bi expressed as $Bi_2O_3$ forming an intergranular bismuth oxide phase, the varistor material further comprising a mixture of spinel forming components comprising Mn, Co, Ni and Cr expressed as $MnO_2$, CoO, NiO and $Cr_2O_3$, respectively, and optionally Si expressed as $SiO_2$, the amount of $SiO_2$ being less than 0.05 mol %, the varistor material additionally comprising at least one dopant selected from the group consisting of Ag and B, the varistor material further comprising a spinel phase, wherein the amount of a pyrochlore phase comprised in the varistor material is such that the ratio of the pyrochlore phase to the spinel phase is less than 0.15:1, and wherein a target switching field strength ranges from 250 to 400 V/mm.

12. A varistor material for a surge arrester comprising ZnO forming a ZnO phase and Bi expressed as $Bi_2O_3$ forming an intergranular bismuth oxide phase, wherein an amount of the $Bi_2O_3$ is from 0.6 to 0.9 mol %, the varistor material further comprising $Sb_2O_3$ in an amount from 0.9 to 1.5 mol %, a mixture of spinel forming components comprising Mn, Co, Ni and Cr expressed as $MnO_2$, CoO, NiO and $Cr_2O_3$, respectively, a total amount of $MnO_2$, CoO, NiO and $Cr_2O_3$ being at least 3 mol %, and optionally Si expressed as $SiO_2$ in an amount of less than 0.05 mol %, the varistor material further comprising a spinel phase, wherein the amount of a pyrochlore phase comprised in the varistor material is such that the ratio of the pyrochlore phase to the spinel phase is less than 0.15:1.

* * * * *